United States Patent
McElvain

(10) Patent No.: US 7,391,536 B2
(45) Date of Patent: *Jun. 24, 2008

(54) METHOD FOR SMOOTH TRAPPING SUPPRESSION OF SMALL GRAPHICAL OBJECTS USING COLOR INTERPOLATION

(75) Inventor: Jon S. McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 894 days.

This patent is subject to a terminal disclaimer.

(21) Appl. No.: 10/888,921

(22) Filed: Jul. 9, 2004

(65) Prior Publication Data

US 2006/0007496 A1    Jan. 12, 2006

(51) Int. Cl.
*G06K 15/00* (2006.01)
*G06K 9/00* (2006.01)
*G03F 3/08* (2006.01)
*G09G 5/02* (2006.01)

(52) U.S. Cl. .................. 358/1.9; 358/518; 358/3.27; 345/589; 345/619; 382/162; 382/167

(58) Field of Classification Search .............. 358/1.9, 358/530, 1.15, 1.17, 504, 518, 3.26, 540, 358/3.27; 345/589, 619; 382/162, 167
See application file for complete search history.

(56) References Cited

U.S. PATENT DOCUMENTS

| | | | |
|---|---|---|---|
| 5,542,052 A * | 7/1996 | Deutsch et al. ............ 345/589 |
| 5,687,303 A | 11/1997 | Motamed et al. ........... 395/117 |
| 6,006,013 A | 12/1999 | Rumph et al. .............. 395/114 |
| 6,256,104 B1 | 7/2001 | Rumph et al. .............. 358/1.15 |
| 6,327,043 B1 | 12/2001 | Rumph et al. .............. 358/1.15 |
| 6,345,117 B2 | 2/2002 | Klassen ..................... 382/167 |
| 6,594,030 B1 * | 7/2003 | Ahlstrom et al. ........... 358/1.15 |
| 6,654,145 B1 * | 11/2003 | Speck ........................ 358/1.9 |
| 6,757,072 B1 | 6/2004 | McElvain ................... 358/1.15 |
| 2001/0055130 A1 * | 12/2001 | Geurts et al. .............. 358/530 |
| 2003/0025945 A1 | 2/2003 | Rumph et al. ........... 358/426.13 |
| 2005/0012946 A1 * | 1/2005 | Wilson ....................... 358/1.9 |

OTHER PUBLICATIONS

U.S. Appl. No. 10/411,562, filed Apr. 10, 2003, Jon S. McElvain.
U.S. Appl. No. 10/411,505, filed Apr. 10, 2003, Jon S. McElvain.

* cited by examiner

*Primary Examiner*—Mark Zimmerman
*Assistant Examiner*—Charlotte M Baker
(74) *Attorney, Agent, or Firm*—Jeannette Walder

(57) ABSTRACT

A method for smooth trapping of a small graphical object, includes receiving from a trap generator the location of a trap pixel in a small object that should be changed in color; determining the width of the small object containing the trap pixel; comparing the width of the thin object with a trap threshold width; if the width of the thin object is less than the trap threshold width, adjusting the hue of the trap pixel according to a predetermined relationship; and applying a trap correction to the trap pixel according to the adjusted trap hue. The predetermined relationship may be a linear relationship that interpolates the trap hue monotonically (from the original trap hue to the original object hue) for object widths less than the trap threshold width. The method may be applied to small objects and small font text objects.

11 Claims, 3 Drawing Sheets

METHOD FOR SMOOTH TRAPPING SUPPRESSION OF SMALL GRAPHICAL OBJECTS USING COLOR INTERPOLATION

CROSS-REFERENCE TO RELATED APPLICATIONS

This application is related to co-assigned, U.S. Pat. No. 7,271,934, filed Apr. 10, 2003 to Jon S. McElvain, for Method for Smooth Trap Suppression of Small Graphical Objects Using Run Length Encoded Data ("D/A3047") and U.S. Pat. No. 7,146,043, filed Apr. 10, 2003 to Jon S. McElvain, for Method for Smooth Trap Suppression of Small Graphical Objects ("D/A3049"), the contents of which are incorporated herein by reference

BACKGROUND AND SUMMARY

This invention relates generally to methods for correcting for marking engine characteristics, and more particularly, to a method of smooth trapping suppression of small and thin graphical objects using color interpolation.

Electronic processing of graphic and text images produces multi-color prints using multiple color separations. Typically, four process colors, cyan, magenta, yellow and black, are used to print multiple separations, which tend to have minor misregistration problems. The result of abutting or overlapping shapes is a boundary between adjacent regions of color that, under ideal printing conditions should have zero width. That is, one color should stop exactly where the abutting color begins, with no new colors being introduced along the boundary by the printing process itself. In practice, the realization of a zero width boundary between regions of different color is impossible as a result of small but visible misregistration problems from one printed separation to another. The error is manifested as a "light leak" or as a visible boundary region of an undesired color.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border that has been expanded is referred to as a "trap", and the zone within which color is added is called the "trap zone".

Trapping is generally a two-step process. The first step in the trapping process is to determine where there is an edge on which to apply trapping. Trapping is typically used between pixels that are not of identical color, but it can be used in other locations as well. The second step is to generate the overlay of one or more pixels, in any combination of the color separations, which is done by a trap generator or "trap oracle". The two inputs for the trap generator are the colors on both sides of the edge in question. For example, consider magenta and cyan, with a user-specified maximum trap width of two. The generator will compute from these whether trapping is necessary, what color to use, and where it should be applied. In this example, the correction could be zero (no trapping), one, or two pixels in width in any combination of cyan, magenta, yellow and black, and it could be located in either the magenta or cyan area. Edge detection and image manipulation to perform trapping may be done in any of several processes, including for example, the technique described in U.S. Pat. No. 6,345,117 to Victor Klassen, for "Method for Automatic Trap Selection for Correcting for Separation Misregistration in Color Printing".

For the typical trapping operation, it is assumed that objects to be trapped are very large relative to the trapping region, so that the trap colors will be difficult to distinguish. Thus, the color of only a thin boundary of the object will be changed, while the large internal area will have the original, correct color. However, for objects smaller than a few pixels, or for long, thin objects having a width less than a few pixels, trapping results in visible hue changes in the color of the entire object. For example, if a thin line is only two pixels in width, and the trap generator decides to change the color of those two pixels, the entire color of the thin line has been changed. Small objects, such as small font size text characters, may be printed in an entirely different color. If the thin line, or the small object, happens to be located near a larger object of the same initial color, there will be a visible hue shift relative to the larger object, and the result of the trapping operation will be less desirable than no trapping at all. Existing trapping algorithms (for example Scitex) specify an object or font size threshold below which trapping is disabled. This has the effect of eliminating the hue shift, but misregistration errors become visible once again. Also, previous work by McElvain (D/A3049) describes methods for minimizing the hue shift by reducing the trap radius for small objects. Although implementation of this method is straightforward, visible trap radius nonuniformities can still appear, particularly for small fonts with edges of high curvature.

Disclosed in one embodiment herein is a method for smooth trapping of a small graphical object, which includes receiving from a trap generator the location of a trap pixel in a thin object and the required trap; determining the width of the thin object; comparing the width of the thin object with a predetermined trap threshold width; if the width of the thin object is less than the trap threshold width, adjusting the hue of the trap pixel according to a predetermined relationship; and applying a trap correction to the trap pixel according to the adjusted trap hue. The adjusted trap hue may be determined by interpolating between the original trap color specified by the trap generator and the original object color. This process is repeated for each trap pixel selected by the trap generator. In the case of a thin object, the trap generator would continue selecting trap pixels along the long edge of the thin object until all trapping had been completed.

In accordance with another embodiment of the method, the predetermined relationship may be of the form $t'_\alpha = f_\alpha(w_t, w) \cdot t_\alpha + \{1 - f_\alpha(w_t, w)\} \cdot c_\alpha$, where $t_\alpha$ and $t'_\alpha$ are the original and adjusted trap colors for a separation $\alpha$, $c_\alpha$ is the original object color, w and $w_t$ are the object dimension and threshold, and $f_\alpha(w_t, w)$ is a weight function (dependent on the object width) that dictates the percentage of the original trap color that is to be used. The weight function may be monotonically increasing, wherein $f_\alpha(w_t, w) = (w/w_t)$, for $w < w_t$, and $f_\alpha(w_t, w) = 1$ for $w > w_t$.

In accordance with another embodiment, a method for smooth trapping of a small object, includes receiving from a trap generator the location of a trap pixel at an edge of the small object and the required trap color; wherein a small object has a size of the order of a few pixels; determining a dimension of the small object; comparing the dimension of the small object with a trap threshold width; if the dimension of the object is less than the trap threshold width, for each trap pixel along the edge of the small object, adjusting the hue of the trap pixel according to a predetermined relationship; and applying a trap correction uniformly to the small object according to the adjusted trap hue.

The method may be used for smooth trapping of a text object, and may include receiving from a trap generator the location of a trap pixel in the text object that should be changed in color; wherein a text object has a font size; determining the font size of the text object containing the trap pixel; comparing the font size of the object with a trap threshold width; if the font size of the object is less than the trap threshold width adjusting the hue of the trap pixel according to a predetermined relationship; if the dimension of the object is less than the trap threshold width, for each trap pixel along the edge of the small object, adjusting the hue of the trap pixel according to a predetermined relationship; and applying a trap color correction to the trap pixel according to the adjusted trap hue.

In accordance with another embodiment, a method for smooth trapping of a thin object, can also be extended to apply to "centerline" traps, which occur when the trap engine specifies the trap should encroach into both abutting colors: color A ($C_A$) and color B ($C_B$). A centerline trap occurs when the trap pixel is partially in the color A region and partially in the color B region. In this case, the color interpolation would be applied independently to each portion of the trap pixel—one interpolation involving $C_A$ and the thickness of the thin object, and another involving $C_B$ and the thickness of the first thin object. In this case, trapping will occur on both sides of the boundary with the method being applied to the different original colors on each side of the boundary. A method for smooth trapping of a thin object, includes receiving from a trap generator the location of a trap pixel in a thin object and the required trap color; determining if the trap pixel is located at the interface between a first color and a second abutting color such that a portion of the trap pixel is located in the first color region and another portion of the trap pixel is located in the second color region; determining the width of the thin object; comparing the width of the thin object with a predetermined trap threshold width; if the width of the thin object is less than the predetermined trap threshold width, adjusting the hue of the portion of the trap pixel residing in the first color region according to a first predetermined relationship, and adjusting the hue of the portion of the trap pixel residing in the second color region according to a second predetermined relationship, and applying a trap correction to the portion of the trap pixel residing in the first color region according to the adjusted trap hue for the first color, and; applying a trap correction to the portion of the trap pixel residing in the second color region according to the adjusted trap hue for the second color.

Instead of completely eliminating trapping for dimensions below the threshold, or reducing the trap radius in a monotonic fashion, the proposed methods interpolate between the trap color (specified by the trapping "engine" or generator) and the original object color. The degree of this interpolation is dependent on the local (or global) size of the object relative to the size threshold. For objects with dimensions above the threshold, the trap color would be that specified by the trap engine; for objects with very small dimensions relative to the threshold, the trap color applied would be very close to the original color of the object. Hence any hue and brightness shifts observed for trapped small objects would be significantly reduced, while preserving some of the benefits of trapping.

DETAILED DESCRIPTION

Figure 1:
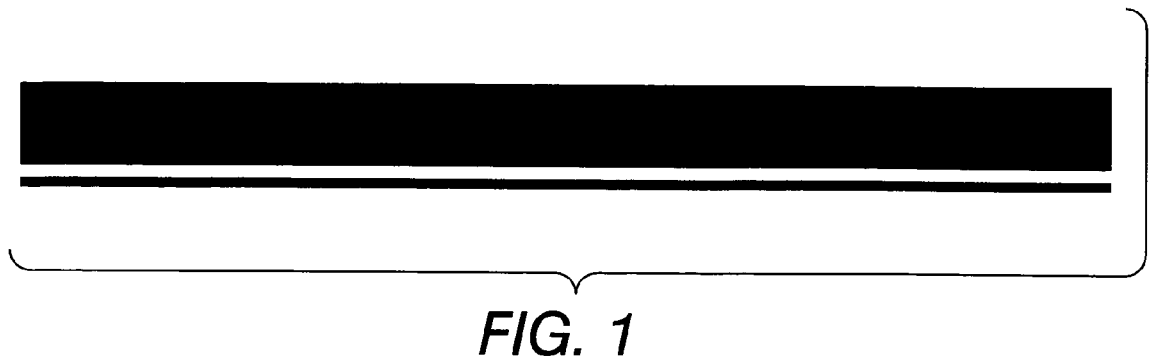
FIG. 1 demonstrates the effect of trapping hue shifts for thin objects.

Consider two different trapping scenarios, a thick and thin red line, as depicted in FIG. 1. In this case, most trap engines will reduce the yellow content at the edges to produce optimal misregistration correction, resulting in a magenta-cast trap. If this trap is applied to the thicker line, the edge hue shift is almost imperceptible relative to the body of the line. However, the thin line shows a noticeable hue shift, since in that case the trap comprises a large fraction of the line area.

Many trapping algorithms completely disable trapping for objects whose dimensions fall below a specified threshold. A drawback to this approach is the return of any misregistration errors that trapping would have reduced. A recent approach described by McElvain in D/A3049 and D/A3047 addresses this problem by reducing the trap radius for objects below the size threshold, and shows considerably better image quality for small objects relative to the threshold-disable methods.

The method disclosed varies trap color for small graphical objects so that the color of the small objects is closer to that of the trapped larger objects. This method is different from existing art in that for small objects (fonts below a selectable size, lines thinner than a selectable width, etc.), trapping is done with a color interpolated to be between the original color and the trap color output by the trap engine. By varying the degree of color interpolation as the object to be trapped gets smaller, a trapped object that is closer to the color of the larger trapped objects is obtained because the effect of the trap has been reduced. This method differs from D/A3047 and D/A3049 in that the hue of the trapped pixels is varied rather than the trap radius.

Instead of reducing the trap radius or eliminating trapping altogether, this method described proposes adjustment of the actual trap color for small objects. The adjusted trap color would be an interpolation between the original trap color (specified by the trap "engine"), and the original object color. The relative weight of this interpolation would be determined by the size of the object relative to the threshold. For objects very small relative to this threshold, the adjusted trap color would be nearly equal to the original object color, whereas for objects with dimensions slightly smaller than the threshold the adjusted trap color would more closely resemble the original trap color. For object dimensions greater than the threshold, there would be no adjustment to the trap color. This can reduce the overall hue shift associated with small object trapping, while preserving some of the misregistration correction trapping provides.

Figure 2:
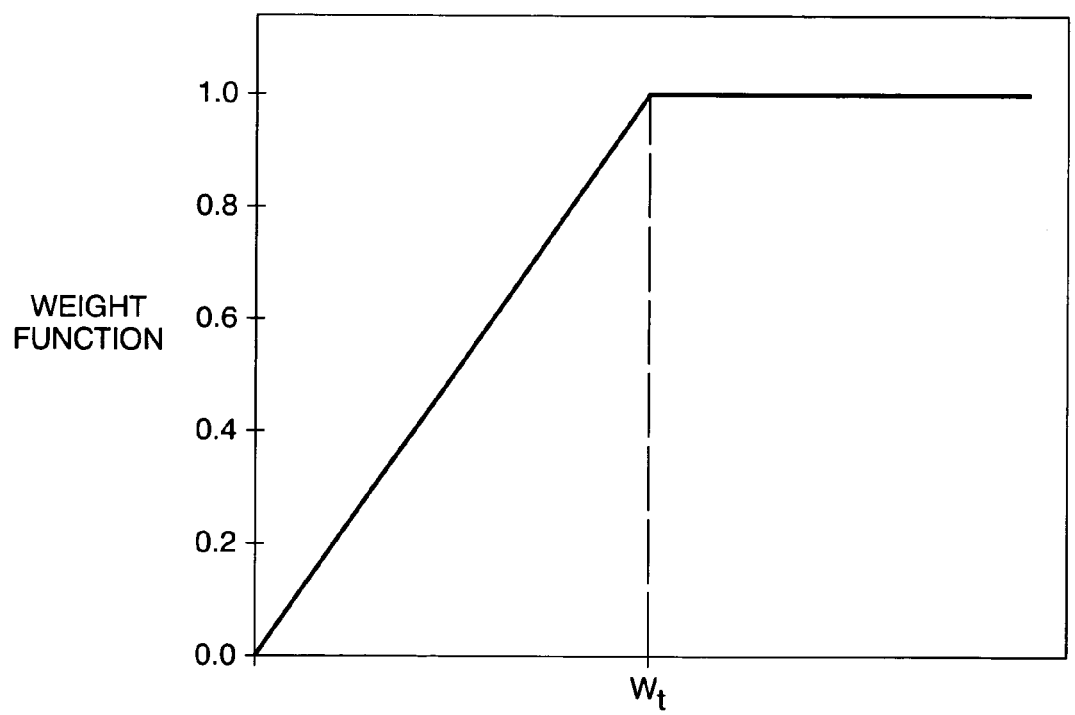
FIG. 2 is an exemplary weight function that is monotonically increasing up to a threshold and unity thereafter.

Various relationships can be used to determine the color interpolation. Mathematically, one example of this interpolation can be represented as $$t'_\alpha = f_\alpha(w_t, w) \cdot t_\alpha + \{1 - f_\alpha(w_t, w)\} \cdot c_\alpha,$$

where $t_\alpha$ and $t'_\alpha$ are the original and adjusted trap colors for separation $\alpha$, $c_\alpha$ is the original object color, w and $w_t$ are the object dimension and threshold, and $f_\alpha(w_t, w)$ is a weight function. The weight function $f_\alpha(w_t, w)$ may be a monotonically increasing function of the object size. The weight function $f$ can be unity above the threshold, and an increasing function below the threshold. It can also be a monotonically increasing function that asymptotically approaches unity near the width threshold. An example weight function $f$ is shown below in FIG. 2, and has been demonstrated to produce the desired effects. The weighting function in FIG. 2 can be a linear function of the form $f_\alpha(w_t, w) = (w/w_t)$ for $w < w_t$.

Other weighting functions may also be applied. For example, a step function which increases as w approached wt may be used. Higher order, monotonically increasing functions may also be used. Any function which meets the requirements of monotonically increasing with object size and $f=1$ when the object dimensions are greater than or equal to the threshold width determined by the trap generator may be used.

Note that this operation can be performed in any color space (with α corresponding to each component or separation of that color space), with a different weight function for each component/separation. For example, one could perform this operation in CIELAB color space, and choose weight functions such that the L* channel of the trap color is unaffected $[f_L(w, w_t)=1$, for all w], whereas the a* and b* channels would be modified via color interpolation with the original object color C. However, for practical purposes, it is likely these weight functions will be the same across all separations. The weight function would then be tuned to provide the best visual performance as a function of object size for the particular color space used.

The method for smooth trapping may be applied to small objects, i.e., objects in which both dimensions (length and width) are less than the trap threshold width of a trap generator (or objects of only a few pixels). A dimension of the small object is determined and compared with the trap threshold width. If the object's dimension is less than the trap threshold width, a predetermined relationship (such as one of those described above with respect to thin objects) is used to interpolate the trap hue. Then trapping is applied uniformly to the entire small object using the interpolated trap hue.

Figure 3:
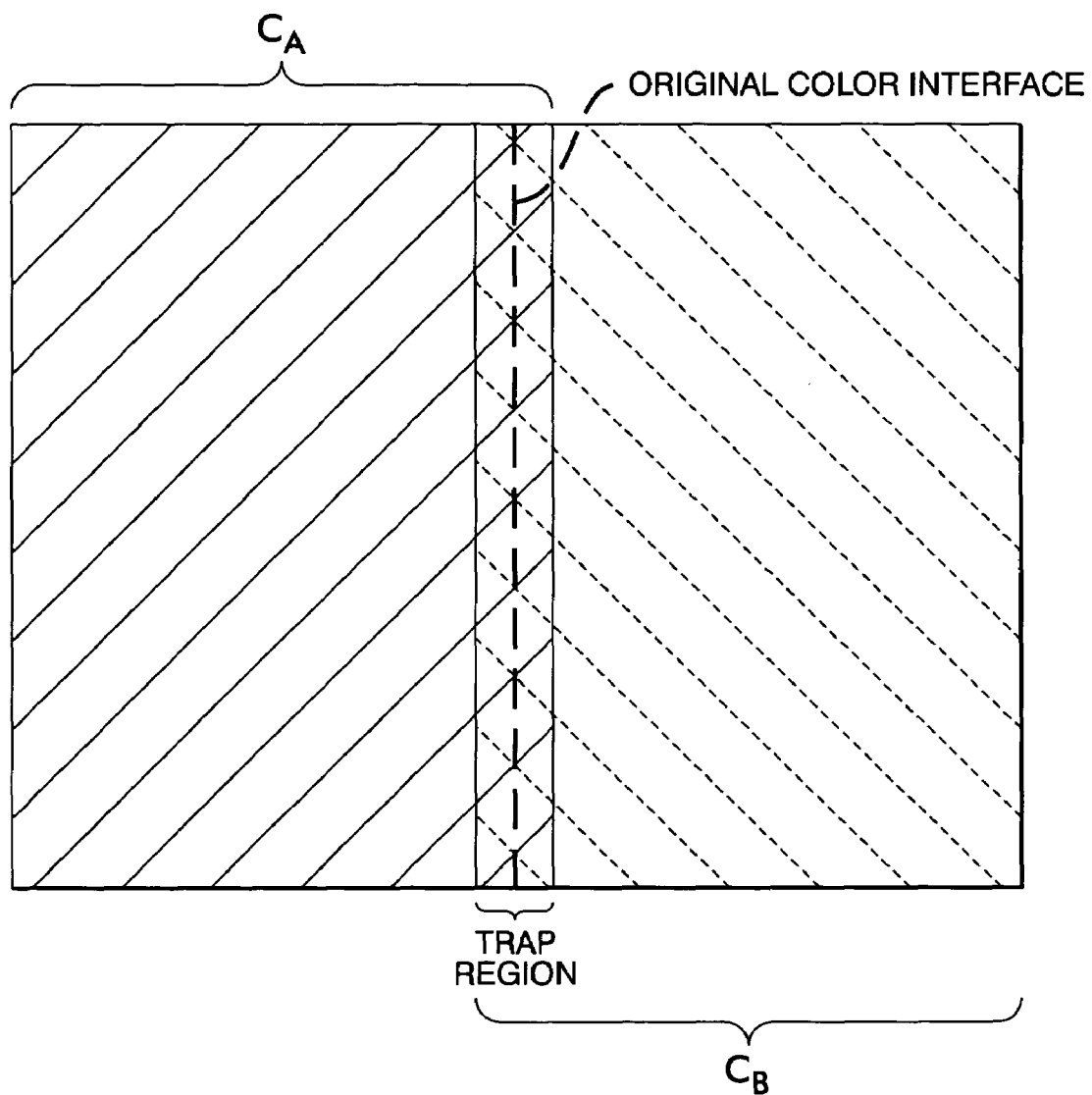
FIG. 3 illustrates a centerline trap pixel that is located at a boundary between two adjacent colors.
Figure 4:
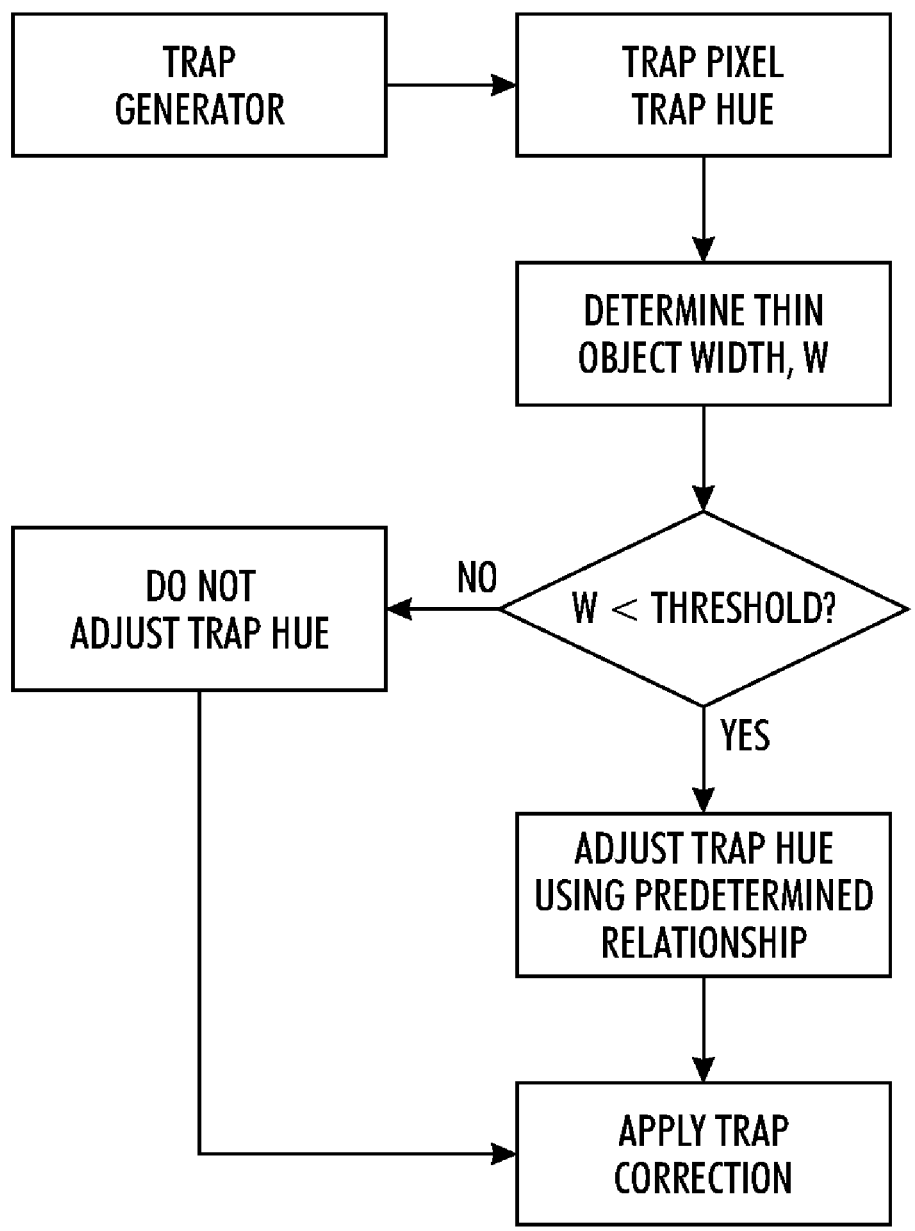
FIG. 4 is a flow chart of a method for smooth trapping of a thin graphical object.

This method can also be extended to apply to "centerline" traps, which occur when the trap engine specifies the trap should encroach into both abutting colors: color A ($C_A$) and color B ($C_B$) as shown in FIG. 3. A portion of the trap pixel is located in color region A and another portion located in color region B. In this case, the color interpolation would be applied independently to each portion of the trap—one interpolation involving $C_A$ and t, and another involving $C_B$ and t. Mathematically, this is described as follows:

$$t'_{A\alpha}=f_{A\alpha}(w_t, w) \cdot t_\alpha + \{1-f_{A\alpha}(w_t, w)\} \cdot c_{A\alpha}, \text{and}$$

$$t'_{B\alpha}=f_{A\alpha}(w_t, w) \cdot t_\alpha + \{1-f_{B\alpha}(w_t, w)\} \cdot c_{B\alpha},$$

where $c_{A\alpha}$ and $C_{B\alpha}$ are the original object colors for color A and B (for separation α), $t'_{A\alpha}$ and $t'_{B\alpha}$ are the adjusted trap colors corresponding to region A and B, and $f_{A\alpha}(w_t, w)$ and $f_{B\alpha}(w_t, w)$ are the object size weight functions associated with region A and B. The object weight functions for A and B are in general different, but may be the same in some cases.

This procedure can equally well be used for font size trapping suppression, where the adjusted trap color would be applied uniformly to the perimeter of the font. The metric in this case would be the font size, and compared to a font size threshold (e.g., 10 pt).

Text objects are generally defined by their font size. If a text character is one color and it is positioned on top of a different colored background (or plain paper), misregistration errors may appear as a shadowing effect. For very small font sizes, many trap generators would simply disable the application of the trap. Instead, the proposed method can be applied to change the trap hue based on a predetermined size relationship and apply the "adjusted hue" trap pixels uniformly to the text characters.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for smooth trapping of a small object, comprising:
   receiving from a trap generator the location of a trap pixel at an edge of the small object and the required trap color;
   wherein a small object has a size of the order of a few pixels;
   determining a dimension of the small object;
   comparing the dimension of the small object with a trap threshold width;
   if the dimension of the object is less than the trap threshold width, for each trap pixel along the edge of the small object, adjusting the hue of the trap pixel according to a predetermined relationship; and
   applying a trap color correction to the trap pixel according to the adjusted trap hue;
   wherein the adjusting step comprises interpolating between the original trap color specified by the trap generator and the original object color.

2. A method for smooth trapping of a thin graphical object, comprising:
   receiving from a trap generator the location of a trap pixel in a thin graphical object and the required trap color;
   determining the width of the thin object;
   comparing the width of the thin object with a predetermined trap threshold width;
   if the width of the thin object is less than predetermined trap threshold width, adjusting the hue of the trap pixel according to a predetermined relationship;
   applying a trap color correction to the trap pixel according to the adjusted trap hue; and
   wherein the adjusting step comprises interpolating between the original trap color specified by the trap generator and the original object color.

3. A method for smooth trapping of a thin graphical object, comprising:
   receiving from a trap generator the location of a trap pixel in a thin object and the required trap color;
   determining the width of the thin object;
   comparing the width of the thin object with a predetermined trap threshold width;
   if the width of the thin object is less than the predetermined trap threshold width, adjusting the hue of the trap pixel according to a predetermined relationship;
   applying a trap color correction to the trap pixel according to the adjusted trap hue; and
   wherein the predetermined relationship comprises:

$$t'_\alpha=f_\alpha(w_t, w) \cdot t_\alpha + \{1-f_\alpha(w_t, w)\} \cdot c_\alpha,$$

where $t_\alpha$ and $t'_\alpha$ are the original and adjusted trap colors for a separation α, $c_\alpha$ is the original object color, w and $w_t$ are the object dimension and threshold, and $f_\alpha(w_t, w)$ is the object size weight function.

4. The method of claim 3, wherein $f_\alpha(w_t, w)=(w/w_t)$ for $w<w_t$, and $f_\alpha(w_t, w)=1$ for $w>w_t$.

5. The method of claim 3, wherein $f_\alpha(w_t, w)$ is a monotonically increasing function that approaches unity at or above the specified trap width threshold.

6. A method for smooth trapping of a thin graphical object, comprising:
   for each separation in CIELAB color space:
   receiving from a trap generator the location of a trap pixel in a thin object and the required trap color;

determining the width of the thin object;

comparing the width of the thin object with a predetermined trap threshold width;

if the width of the thin object is less than the predetermined trap threshold width, adjusting the hue of the trap pixel according to a predetermined relationship;

applying a trap color correction to the trap pixel according to the adjusted trap hue; and wherein the predetermined relationship comprises:

$$t'_\alpha = f_\alpha(w_t, w) \cdot t_\alpha + \{1 - f_\alpha(w_t, w)\} \cdot c_\alpha,$$

where $t_\alpha$ and $t'_\alpha$ are the original and adjusted trap colors for a separation $\alpha$, $c_a$ is the original object color, w and $w_t$ are the object dimension and threshold, and $f_a(w_t, w)$ is the object size weight function.

7. The method of claim 6, wherein the L* separation of the trap is modified more weakly than that of the a* and b* separations.

8. A method for smooth trapping of a thin object, comprising:

receiving from a trap generator the location of a trap pixel in a thin object and the required trap color;

determining if the trap pixel is located at the interface between a first color and a second abutting color such that a portion of the trap pixel is located in the first color region and another portion of the trap pixel is located in the second color region;

determining the width of the thin object;

comparing the width of the thin object with a predetermined trap threshold width;

if the width of the thin object is less than the predetermined trap threshold width, adjusting the hue of the portion of the trap pixel residing in the first color region according to a first predetermined relationship, and adjusting the hue of the portion of the trap pixel residing in the second color region according to a second predetermined relationship;

applying a trap correction to the portion of the trap pixel residing in the first color region according to the adjusted trap hue for the first color; and applying a trap correction to the portion of the trap pixel residing in the second color region according to the adjusted trap hue for the second color.

9. The method of claim 8, wherein the adjusting step for the trap in the first color region comprises interpolating between the original trap color specified by the trap generator and the first color, and the adjusting step for the trap in the second color region comprises interpolating between the original trap color specified by the trap generator and the second color.

10. The method of claim 8, wherein the predetermined relationship for the portion of the trap in the first color (A) region, comprises:

$$t'_{A\alpha} = f_{A\alpha}(w_t, w) \cdot t_\alpha + \{1 - f_{A\alpha}(w_t, w)\} \cdot c_{A\alpha}; \text{ and}$$

wherein the predetermined relationship for the portion of the trap in the second color (B) region comprises:

$$t'_{B\alpha} = f_{B\alpha}(w_t, w) \cdot t_\alpha + \{1 - f_{B\alpha}(w_t, w)\} \cdot c_{B\alpha},$$

where $t_\alpha$ is the original trap color specified by the trap generator for separation $\alpha$, $t'_{A\alpha}$ and $t'_{B\alpha}$ are the adjusted trap colors for the traps residing in regions A and B, $c_{A\alpha}$ and $c_{B\alpha}$ are the original object colors for A and B, w and $w_t$ are the object dimension and threshold, and $f_{A\alpha}(w_t, w)$ and $f_{B\alpha}(w_t, w)$ are the object size weight functions corresponding to regions A and B.

11. The method of claim 10 wherein the object size weight functions for regions A and B, $f_{A\alpha}(w_t, w)$ and $fB\alpha(w_t, w)$, are substantially the same.

* * * * *